United States Patent Office
3,100,777
Patented Aug. 13, 1963

3,100,777
6-METHYL-9α-FLUORO-11β-HYDROXY - 4,6 - PREG-
NADIENE-3,20-DIONE AND THE 11-KETO ANA-
LOGUE THEREOF, THEIR CORRESPONDING
16α-METHYL DERIVATIVES AND THE 1-DEHY-
DRO COUNTERPARTS OF THE FOREGOING
George B. Spero, Kalamazoo, Mich., assignor to The
Upjohn Company, Kalamazoo, Mich., a corporation of
Delaware
No Drawing. Filed May 31, 1962, Ser. No. 198,748
9 Claims. (Cl. 260—397.3)

This invention relates to certain novel steroids, more particularly to 6-methyl-9α-fluoro-11β-hydroxy-4,6-pregnadiene-3,20-dione, 6-methyl-9α-fluoro-4,6-pregnadiene-3,11,20-trione, 6,16-dimethyl - 9α - fluoro-11β-hydroxy-4,6-pregnadiene-3,20-dione, 6,16α - dimethyl - 9α - fluoro-4,6-pregnadiene-3,11,20-trione, the 1-dehydro derivatives of the foregoing and processes for the production of all of these compounds.

The novel compounds of this invention can be prepared in accordance with the following flow sheets, the various steps of which are illustrated in the preparations and examples, below.

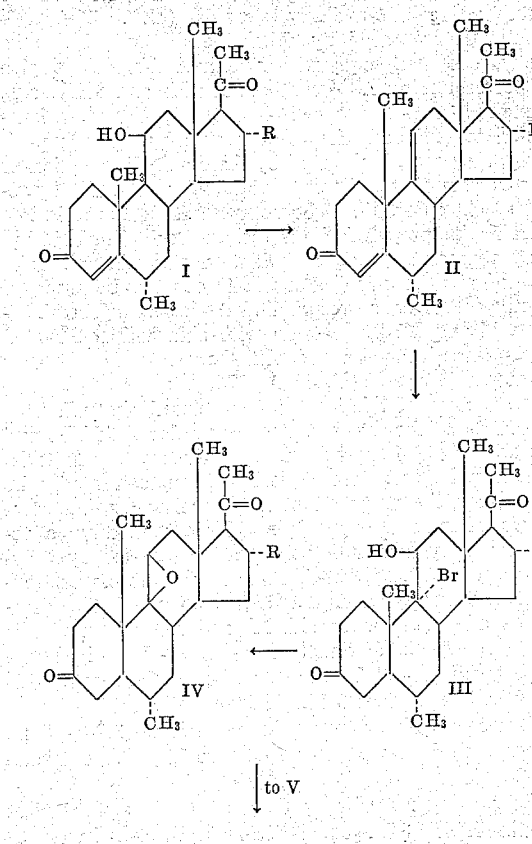

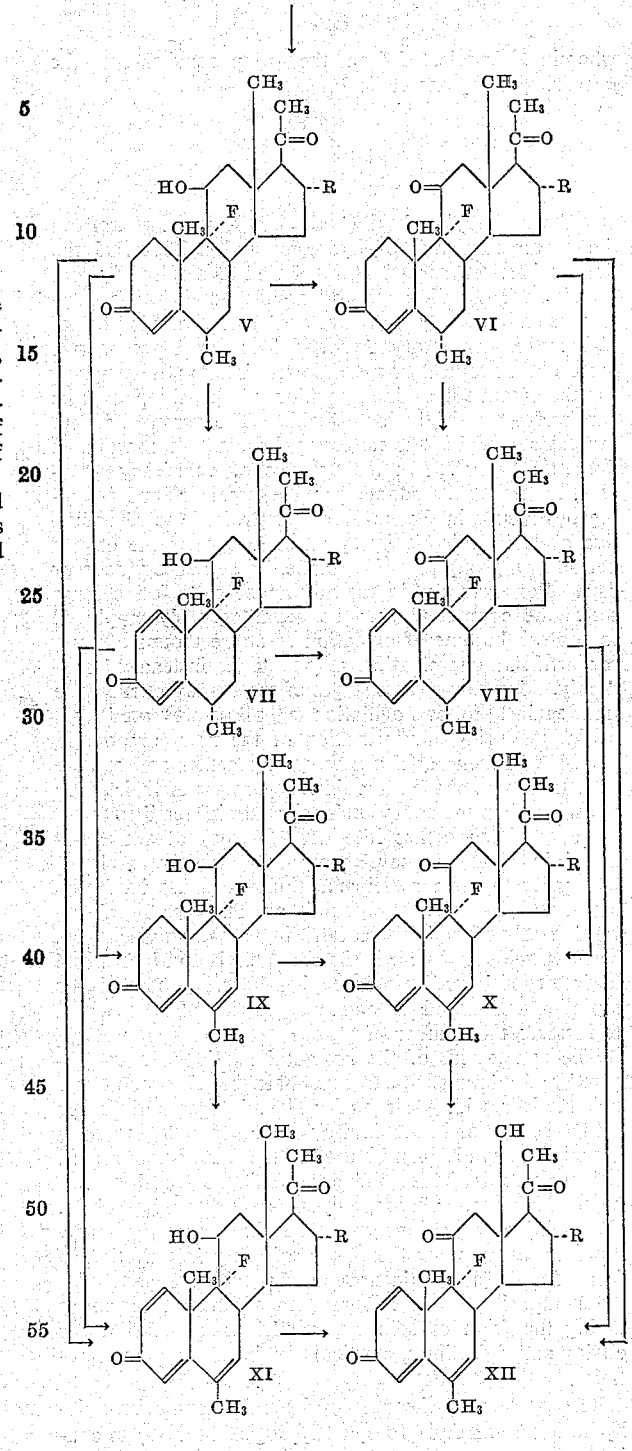

wherein R is selected from the group consisting of hydrogen and methyl.

The novel compounds of the present invention of Formulae IX, X, XI and XII can be represented by the following formula

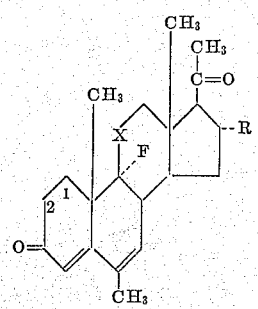

wherein X is selected from the group consisting of the β-hydroxymethylene radical

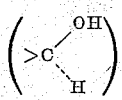

and the carbonyl radical (>C=O), R is selected from the group consisting of hydrogen and methyl and the linkage between carbon atoms 1 and 2 is selected from those consisting of single and double bonds. The compounds embraced by the above composite formula possess high anti-inflammatory activity. The novel compounds are useful as topical or systemic anti-inflammatory agents for the treatment of inflammation of the skin, eye and ears and systemically for arthritis. The compounds are moreover useful in the estrus synchronization of valuable domestic animals. In the practice of veterinary medicine, the novel compounds provide beneficial and advantageous results in the hormonal control of the reproductive cycle in animals by synchronization of the estrual period in a group of swine, cattle, horses, sheep, dogs or cats. For example, in the raising of cattle on a large scale, the compounds can be advantageously employed to control the time of ovulation of entire groups of cows for artificial insemination at one time, instead of randomly. Cows in various stages of the 21-day estrus cycle that regularly follows ovulation will all be prevented from ovulating during administration of the new compounds, and all will then begin a new cycle together and ovulate after treatment at the same time, regardless of their phase of estrus when the compounds were administered to them. Since the bitch comes into heat (estrus) at about six-month intervals, the novel compounds need be employed only prior to these anticipated times to cause inhibition of estrus. The new compounds are also useful in preventing estrual activity in fattening meat animals, e.g., feed lot heifers. In birds the compounds can be utilized to interrupt broodiness in laying hens, to control the moulting period and the egg laying period of a flock, and to increase the number of eggs.

The compounds of the present invention can be prepared and administered to mammals, birds, humans and animals in a wide variety of oral and parenteral dosage forms, simply or in admixture with other co-acting compounds. They also can be used in the form of ointments, lotions, creams, jellies and drops suitable for the treatment of inflamed skin areas, eyes, ears, or nose irritations. The solid compositions can take the form of tablets, powders, capsules or the like, preferably in unit dosage forms for simple administration of precise dosages. Liquid compositions can be prepared of these compounds taking the form of solution, emulsions, suspensions or elixirs and injectibles, particularly intra-articular injectibles.

The process of the present invention comprises: dehydrating 6α-methyl-11β-hydroxyprogesterone (I) in conventional manner, for example with N-halo-acylamide and sulfur dioxide, or alternatively for example an acid such as sulfuric acid in acetic acid, to obtain 6α-methyl-4,9(11)-pregnadiene-3,20-dione (II); adding to a solution of the thus-obtained 4,9(11)-pregnadiene (II), dissolved in an organic solvent, a N-haloacylamide in the presence of an acid to obtain the corresponding 6α-methyl - 9α - halo - 11β - hydroxy-4-pregnene-3,20-dione (III); treating compound III with a mild base to obtain 6α - methyl-9β,11β-oxido - 4 - pregnene-3,20-dione (IV); treating this oxido compound (IV) with a source of hydrogen fluoride to obtain 6α-methyl-9α-fluoro-11β-hydroxy-4-pregnene-3,20-dione (V).

Oxidizing 6α-methyl-9α-fluoro - 11β - hydroxy-4-pregnene-3,20-dione (V) with a chromic acid oxidant, or hypohalous acid preferably produced in situ, results in 6α - methyl - 9α - fluoro-4-pregnene-3,11,20-trione (VI). Submitting 6α-methyl-9α-fluoro-11β-hydroxy - 4-pregnen-3-one (V) or 6α-methyl-9α-fluoro-4-pregnen-3,11,20-trione (VI) to dehydrogenation by a microorganism such as Septomyxa, Calonectria, Alternaria, Colletotrichum, Cylindrocarpon, Ophiobolus, Listeria, Corynebacterium, Erysipelothrix, species of the family Tuberculariaceae, Nocardia, Cucurbitaria, Leptosphaeriae, Tricothecium, Mycobacterium, Fusarium, Didymella and the like, or dehydrogenation with selenium dioxide results in the production of 6α-methyl-9α-fluoro-11β-hydroxy-1,4-pregnadiene-3,20-dione (VII) and 6α - methyl-9α-fluoro-1,4-pregnadiene-3,11,20-trione (VIII), respectively.

The compounds of Formulae V, VI, VII and VIII are converted to the corresponding 6-dehydro derivatives of Formulae IX, X, XI and XII in accordance with procedures well known in the steroid art. The compounds represented by Formulae V and VI when reacted with chloranil, in the manner disclosed in J. Amer. Chem. Soc. 79, 1257 (1957), yield the corresponding 6-methyl-6-dehydroprogesterones of Formulae IX and X, respectively, e.g., 6-methyl-9α-fluoro - 11β - hydroxy-4,6-pregnadiene-3,20-dione (IX) and its 11-keto counterpart (X). The compounds of Formula X can also be prepared by the oxidation, e.g., with chromic acid, of the corresponding 11β-hydroxy steroids (IX). The Δ⁴,⁶-compounds embraced by Formulae IX and X can be 1-dehydrogenated, e.g., with selenium dioxide, to give the corresponding Δ¹,⁴,⁶-compounds (XI and XII), e.g., 6 - methyl - 9α - fluoro - 11β-hydroxy-1,4,6-pregnatriene-3,20-dione (XI) and its 11-keto analogue (XII); preferably, they can be prepared by the 6-dehydrogenation of the corresponding Δ¹,⁴-compounds (VII and VIII) by reaction with chloranil. The compounds of Formula XII can also be prepared from the corresponding 11β-hydroxy compounds, e.g., by oxidation with chromic acid. The Δ¹,⁴,⁶-compounds (XI and XII) can also be prepared directly from the corresponding Δ⁴-compounds of Formulae V and VI by reaction with chloranil at elevated temperatures in accordance with the method set forth in J. Amer. Chem. Soc. 82, 4293 (1960).

The process of this invention, disclosed above for the preparation of the compounds of Formulae IX, X, XI and XII, wherein R is hydrogen, from the starting material of Formula I, wherein R is hydrogen, can readily be utilized for the preparation of the corresponding compounds wherein R is methyl. This can readily be accomplished by substituting 6α,16α-dimethyl-11β-hydroxyprogesterone (I) as starting material for the corresponding 16α-desmethyl compound (I), to yield the compounds of Formulae IX, X, XI and XII wherein R is methyl, namely 6,16α-dimethyl-9α-fluoro - 11β - hydroxy-4,6-pregnadiene - 3,20 - dione (IX), 6,16α-dimethyl-9α-fluoro-4,6-pregnadiene-3,11,20-trione (X), 6,16α-dimethyl-9α-fluoro-11β-hydroxy-1,4,6-pregnatriene - 3,20 - dione (XI) and 6,16α-dimethyl - 9α - fluoro-1,4,6-pregnatriene-3,11,20-trione (XII).

The starting material of Formula I of the flow-sheet wherein R is hydrogen, is 6α-methyl-11β-hydroxyprogesterone (I); it is prepared in the manner disclosed in Example 16 of U.S. Patent 2,968,655.

The starting material of Formula I of the flow-sheet, wherein R is methyl, is prepared from the known compound 6α,16α-dimethylprogesterone (a) (J. Org. Chem. 26, 2047 [1961]), in accordance with the following flow-sheet, the various steps of which are illustrated in the preparations below.

of Formula a is readily carried out by the method disclosed in U.S. Patent 2,602,769 and yields the compound of Formula b, namely, 6α,16α-dimethyl-11α-hydroxyprogesterone. An effective method of converting the 11α-hydroxy compound of Formula b to the corresponding 11β-hydroxy epimer (I) is readily available by adapting the procedure disclosed in U.S. Patent 2,968,655 for an analogous synthesis. In a similar manner,

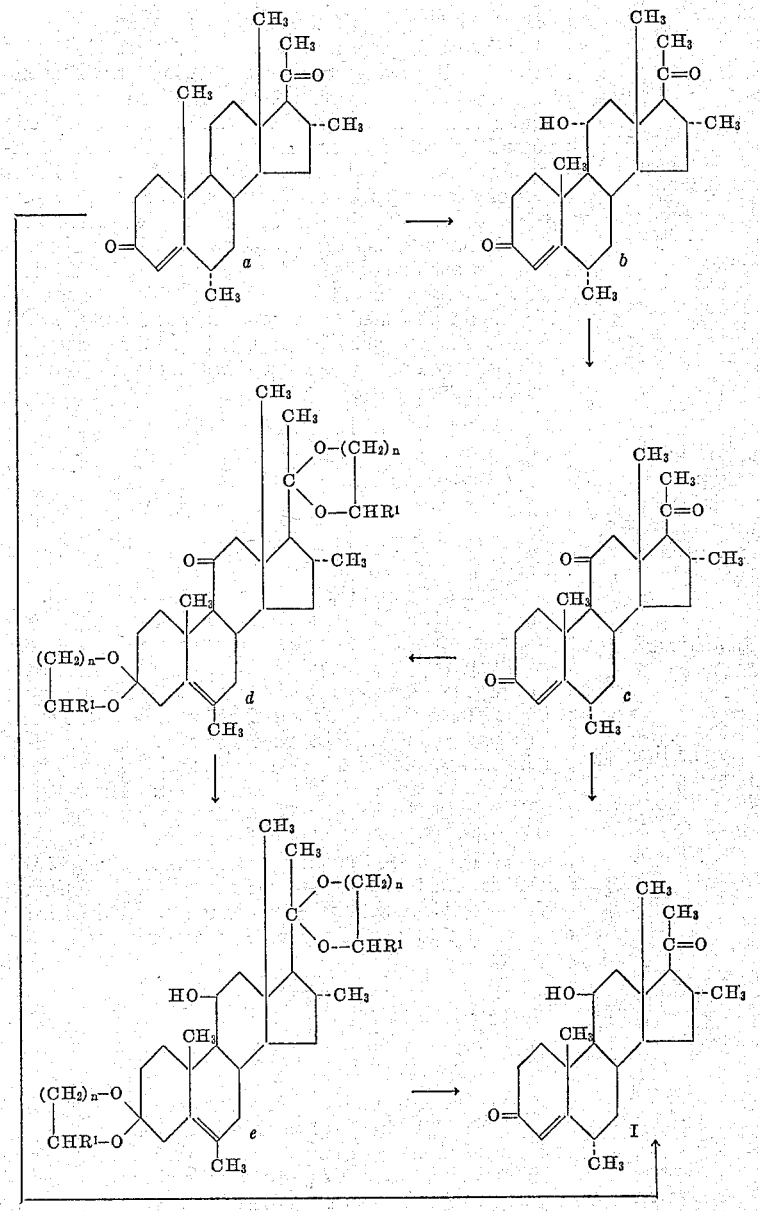

wherein n is an integer selected from the group consisting of one and two and R' is selected from the group consisting of hydrogen and a lower-alkyl radical containing from one to six carbon atoms, inclusive.

The compound represented by Formula a can be 11β- or 11α-hydroxylated with one of the many species of fungi known to oxygenate in that position, e.g., one of the order of Mucorales, Aspergillis, Penicillium, such as, Rhizopus nigricans, Curvularea lunata or Cunninghamella blakesleeana.

11β-hydroxylation of 6α,16α-dimethylprogesterone (a) by fermentation, e.g., with Cunninghamella blakesleeana (ATCC 8688b), is directly productive of 6α,16α-dimethyl-11β-hydroxyprogesterone (I).

The fermentative 11α-hydroxylation of the compound

6α,16α-dimethyl - 11α - hydroxyprogesterone (b) is converted to the corresponding 11-keto compound (c) by oxidation, e.g., with chromic acid, chromic anhydride or N-bromoacetamide in pyridine, in accordance with the usual procedures well known in the steroid art. The thus produced 6α,16α-dimethyl-11-ketoprogesterone (c) is diketalized, e.g., with ethylene glycol and p-toluenesulfonic acid to give 6,16α-dimethyl-11-ketoprogesterone-3,20-bis(ethylene ketal) (d); the compound of Formula d is reduced to its corresponding 11β-hydroxy analogue (e), e.g., with lithium aluminum hydride, to yield 6,16α-dimethyl - 11β - hydroxyprogesterone 3,20-bis (ethylene ketal) (e). The compound of Formula e is hydrolyzed, with a mineral acid such as sulfuric to give 6α,16α-dimethyl-11β-hydroxyprogesterone (I).

The following preparations and examples are illustrative of the products and processes of the present invention.

PREPARATION I

*6α,16α-Dimethyl-11β-Hydroxy-4-Pregnene-3,20-Dione (6α,16α-Dimethyl-11β-Hydroxyprogesterone)* (I)

A seed culture of *Cunninghamella blakesleeana* (ATCC 8688*b*), obtained from spores grown on a 2% agar, 5% malt extract solids at a pH of 6.0 is prepared by growth in a medium containing, per liter of tap water, 10 g. of dextrose (Cerelose) and 20 g. of liquid corn steep liquor (containing about 12 g. solids) adjusted to a pH of about 5 with 25% aqueous sodium hydroxide.

Five one-liter portions of the above medium are inoculated with the seed culture and growth with aeration and shaking was continued for 48 hours. Then 0.2 g. of 6α,16α-dimethyl-4-pregnene-3,20-dione (*a*) in 30 ml. of alcohol is added to each flask and fermentation continued for another 48 hours, at which time the pH is 5.9.

The mycelium is filtered from the beer and the beer extracted four times with one-fourth by volume amounts of methylene chloride containing 25% ethyl acetate. The extracts are evaporated to dryness. The residue thus obtained is redissolved in 150 ml. of methylene chloride and chromatographed on a column of Florisil (synthetic magnesium silicate). The column is developed with hexanes containing increasing proportions of acetone to elute a mixture containing the desired 11β-hydroxy-product. The crude product is crystallized from a mixture of hexanes and acetone and recrystillized from the same solvent pair to yield light colored, crystalline 6α,16α-dimethyl-11β-hydroxy-4-pregnene-3,20-dione (I).

PREPARATION b

*6α,16α-Dimethyl-11α-Hydroxy-4-Pregnene-3,20-Dione (6α,16α-Dimethyl-11α-Hydroxyprogesterone)* (*b*)

A medium is prepared containing 10 g. of Cerelose dextrose technical grade and 20 g. of corn steep liquor (60% solids) in sufficient tap water to make up one liter of solution. One hundred liters of such a medium is adjusted by the addition of 25% sodium hydroxide solution to a pH of 5. Thereto is then added 400 ml. of lard oil and lard-oil octadecanol as an anti-foaming agent. This medium is sterilized for 45 minutes at 20 lbs. pressure and inoculated with *Rhizopus nigricans* minus strain, American Type Culture Collection No. 6227*b*, and incubated for 24 hours at a temperature of 28° C. using a rate of aeration and stirring such that the oxygen uptake is 6.3 to 7 millimoles per hour per ml. of sodium sulfite according to the method of Cooper, Fernstrom and Miller, Ind. Eng. Chem. 36, 504 (1944). To this medium containing a 24-hour growth of *Rhizopus nigricans* minus strain is added 6. g. of 6α,16α-dimethyl-4-pregnene-3,20-dione (*a*) in 150 ml. of acetone to provide a suspension of the steroid in the culture. After an additional 24 hour period of incubation under the same conditions of temperature and aeration, the beer and mycelium are extracted. The mycelium is filtered, washed twice each time with a volume of acetone approximately equal to the volume of the mycelium, and extracted twice, each time with a volume of methylene chloride approximately equal to the volume of the mycelium. The acetone and methylene chloride extracts including solvents are added to the beer filtrate. The mixed extracts and beer filtrate are extracted successively with two one-half by volume portions of methylene chloride and then with two one-fourth by volume portions of methylene chloride. The combined methylene chloride extracts are washed with two one-tenth by volume portions of a 2% aqueous solution of sodium bicarbonate and then with two one-tenth by volume portions of water. After drying the methylene chloride extracts with about 3 to 5 g. of anhydrous sodium sulfate per liter of solvent and filtering, the solvent is removed by distillation. The residue is dissolved in a minimum of methylene chloride and chromatographed over Florisil. The product, eluted with increasing proportions of acetone in Skellysolve B (hexanes), is recrystallized from methanol to yield light colored, crystalline 6α,16α-dimethyl-11α-hydroxy-4-pregnene-3,20-dione (*b*).

PREPARATION c

*6α,16α-Dimethyl-4-Pregnene-3,11,20-Trione (6α,16α-Dimethyl-11-Ketoprogesterone)* (*c*)

A solution is prepared containing 3.5 g. of 6α,16α-dimethyl-11α-hydroxyprogesterone (*b*) in 50 ml. of acetic acid at room temperature. Thereto is added drop-wise a solution of 2 g. of chromium trioxide in 50 ml. of acetic acid and 0.5 ml. of water. During the addition, the temperature is maintained between 20 to 23° C. and thereafter for another period of 1.5 hours. The reaction mixture is then diluted with 1 l. of water and extracted with six 150 ml. portions of methylene chloride. The extracts are combined, washed with dilute sodium bicarbonate solution and water, dried over anhydrous sodium sulfate and evaporated to dryness under reduced pressure. The thus obtained solid is recrystallized from ethanol to yield light colored, crystalline, 6α,16α-dimethyl-4-pregnene13,11,20-trione (*c*).

PREPARATION d

*6,16α-Dimethyl - 5 - Pregnene - 3,11,20 - Trione 3,20-Bis (Ethylene Ketal)* [*6,16α - Dimethyl - 11 - Ketoprogesterone-3,20-Bis (Ethylene Ketal)*] (*d*)

A mixture of 300 mg. of 6,16α-dimethyl-4-pregnene-3,11,20-trione (*c*), 5 ml. of ethylene glycol, 50 mg. of paratoluenesulfonic acid monohydrate and 100 ml. of benzene is placed in a reaction flask equipped with a reflux condenser and a water trap so arranged that the condensed vapors pass through the water trap before returning to the reaction flask. The mixture is heated to reflux and allowed to reflux for about 5 hours while at the same time being agitated. The water of reaction formed is continuously removed by codistillation with the refluxing benzene and is collected in the water trap. The benzene solution is then washed with successive portions of a dilute sodium bicarbonate solution and water, and then dried. The residue remaining after evaporation of the solvent is crude 6,16α-dimethyl-5-pregnene-3,11,20-trione 3,20-bis-(ethylene ketal) (*d*) which is recrystallized from ethyl acetate to give the pure, light colored, crystalline product.

PREPARATION e

*6,16α - Dimethyl - 11β - Hydroxy - 5 - Pregnene - 3,20-Dione 3,20-Bis(Ethylene Ketal)* [*6,16α-Dimethyl-11β-Hydroxyprogesterone 3,20-Bis (Ethylene Ketal)*] (*e*)

To a solution of 10 g. of lithium aluminum hydride suspended in 800 ml. of ether is added 10 g. of 6,16α-dimethyl-5-pregnene-3,11,20-trione 3,20-bis (ethylene ketal) (*d*) dissolved in 500 ml. of ether. This mixture is stirred for about 45 minutes at room temperature after which time it is refluxed for about one hour and then cooled and hydrolyzed with water. The precipitate and water are extracted repeatedly with ether and the combined ether extracts evaporated after washing with water and drying with anhydrous sodium sulfate. The resulting crystalline residue is essentially a quantitative yield of crude 6,16α-dimethyl - 11β - hydroxy-progesterone 3,20-bis(ethylene ketal) (*e*), which on recrystallization gives the pure, light colored, crystalline product.

PREPARATION I[e]

*6α,16α-Dimethyl-11β-Hydroxy-4-Pregnene-3,20-Dione (6α,16α-Dimethyl-11β-Hydroxyprogesterone)* (I[*e*])

To a solution of 2 g. of 6,16α-methyl-11β-hydroxyprogesterone 3,20-bis-(ethylene ketal) (*e*) in 75 ml. of acetone, is added one ml. of concentrated sulfuric acid in 25 ml. of water and the resulting acidic mixture allowed to stand for about 15 hours. The solution is then concentrated and water added until crystallization takes place. The thus obtained 6α,16α-dimethyl-11β-hydroxyprogesterone (I) is collected on a filter and purified by recrystallization from ethyl acetate to give pure 6α,16α-dimethyl-11β-hydroxyprogesterone (I).

PREPARATION 1

6α-Methyl-4,9(11)-Pregnadien-3,20 (II)

A solution of 5.0 g. of 6α-methyl-11β-hydroxyprogesterone (I) in 58 ml. of dry pyridine (distilled over barium oxide), was treated with 3.0 g. of N-bromoacetamide. The mixture was stirred for about 15 minutes and cooled to 0° C. Gaseous sulfur dioxide was slowly passed over the surface of the reaction mixture for a period of about one-half hour at 12° C. until the reaction mixture gave a negative reaction with potassium iodide-starch paper. The reaction mixture was then poured into 150 ml. of ice water and stirred. A yellowish-white gummy material was collected on filter paper; the filtrate was extracted with three fifty-milliliter portions of methylene chloride, and the gum was dissolved in the combined extracts of methylene chloride. The thus-obtained methylene chloride solution was washed several times with water, then dried over anhydrous sodium sulfate and evaporated to dryness at 60° C. in vacuo to yield a residue of 4.62 g. This residue was chromatographed over 350 g. of Florisil. For the chromatography the 4.62 g. of residue was redissolved in 350 ml. of methylene chloride and poured over the Florisil charged column. The first three fractions of 375 ml. each of a solvent consisting of 5% acetone and 95% Skellysolve B (hexanes) were collected and discarded. Thereupon 15 fractions of 375 ml. each, consisting of 8% acetone and 92% Skellysolve B were collected, combined, dried and evaporated to give 3.27 g. of yellowish crystals. These crystals were recrystallized from methanol to give 2.18 g. of product melting between 115 to 118° C. Yield, 46.3% of theory. An analytical sample of 6α-methyl-4-9(11)-pregnadiene-3,20-dione (II) was prepared which melted at 117 to 119.5° C. and had a rotation $[\alpha]_D$ at 22° C. of +114° C. in acetone.

Analysis.—Calcd. for $C_{22}H_{30}O_2$: C, 80.94; H, 9.26. Found: C, 80.80; H, 9.19.

Following the procedure of Preparation 1 but substituting 6α,16α-dimethyl-11β-hydroxyprogesterone (I) as starting material, yields 6α,16α-dimethyl-4,9(11)-pregnadiene-3,20-dione (II).

PREPARATION 2

6α-Methyl-9α-Bromo-11β-Hydroxy-4-Pregnene-3,20-Dione (III)

A solution of 3.68 g. of 6α-methyl-4,9(11)-pregnadiene-3,20-dione (II) in 68 ml. of methylene chloride and 132 ml. of tertiary butanol was prepared. To this solution was added at room temperature (about 23° C.) a solution of 10.45 ml. of 72% perchloric acid in 78.8 ml. of water and a solution of 1.92 g. of N-bromoacetamide in 33.5 ml. of tertiary-butanol. The mixture was stirred for 15 minutes and thereupon a solution of 1.92 g. of sodium sulfite in 104.5 ml. of water was added. The mixture was then concentrated in vacuo until crystals appeared. The reaction mixture was thereupon cooled to 5° C. and diluted wtih stirring with 350 ml. of ice cold water. A solid of an off-white color was collected on filter paper, washed with water until neutral and dried in a vacuum desiccator at room temperature. The material obtained, 6α-methyl-9α-bromo-11β-hydroxy-4-pregnene-3,20 - dione (III), weighed 4.9 g. (102% of theory) and possessed a melting point of 144.5 to 145.5° C. This material was used in the next step without further purification.

Following the procedure of Preparation 2, but substituting 6α,16α-dimethyl-4,9(11)-pregnadiene-3,20-dione (II) as starting material, gives 6α,16α-dimethyl-9α-bromo-11β-hydroxy-4-pregnene-3,20-dione (III).

PREPARATION 3

6α-Methyl-9β-11β-Oxido-4-Pregnene-3,20-Dione (IV)

A solution of 4.9 g. of crude 6α-methyl-9α-bromo-11β-hydroxy-4-pregnene-3,20-dione (III), as obtained in Preparation 2, in 168 ml. of acetone, was stirred and refluxed with 5.8 g. of anhydrous potassium acetate for a period of 20½ hours. The yellow mixture was concentrated in vacuo to 75 ml. in volume and poured thereupon into one liter of water. After extracting the reaction mixture with three 250-ml. portions of methylene chloride, drying the extracts over anhydrous sodium sulfate and evaporating to dryness in vacuo, 3.57 g. of oil was obtained. The oil was dissolved in 300 ml. of methylene chloride and poured over a column of 300 g. of Florisil (magnesium silicate). The column was developed with 16 portions of 8% acetone–92% Skellysolve B, and one portion of 10%–90% Skellysolve B. Each solvent portion was 375 ml. Fractions 6 through 16 were combined, dried and evaporated to give 3.1 g. of semicrystalline material which was recrystallized from methanol to give 2.35 g. of product as needles of melting point 119 to 122° C. The yield was therefore 61% of theory. An analytical sample of 6α-methyl-9β,11β-oxido-4-pregnene-3,20-dione (IV) was prepared which melted at 120.5 to 122° C. and had a rotation of $[\alpha]_D$ of +69° in acetone.

Analysis.—Calcd. for $C_{22}H_{30}O_3$: C, 77.15; H, 8.83. Found: C, 75.84; H, 8.73.

Following the procedure of Preparation 3 but substituting 6α,16α - dimethyl-9α-bromo-11β-hydroxy-4-pregnene-3,20-dione (III) as starting material, yields 6α,16α-dimethyl-9β,11β-oxido-4-pregnene-3,20-dione (IV).

PREPARATION 4

6α-Methyl-9α-Fluoro-11β-Hydroxy-4-Pregnene-3,20-Dione (6α-Methyl-9α-Fluoro-11β-Hydroxyprogesterone) (V)

A solution of 2.03 g. of 6α-methyl-9β,11β-oxido-4-pregnene-3,20-dione (IV) in 30 ml. of methylene chloride and 16.8 g. of tetrahydrofuran was cooled in Dry-Ice bath for 10 minutes. This solution was added portionwise in a 10-minute period with agitation to 9.6 g. of hydrofluoric acid, cooled in a Dry-Ice bath, in a polyethylene bottle. After standing in the bath for 20 minutes and thereafter in a refrigerator for 17 hours, the light colored solution was poured into a solution of 46 g. of sodium bicarbonate in 920 ml. of water and stirred until gas evolution ceased. The mixture was then separated and the aqueous layer was extracted with methylene chloride. The combined extracts and organic layer were washed with water, dried over anhydrous sodium sulfate and evaporated to dryness in vacuo at 60° C. The thus-obtained oily residue of 3.15 g. weight was redissolved in 300 ml. of methylene chloride and poured through a column, charged with 315 g. of Florisil magnesium silicate. This column was developed as follows: Fractions 1 through 6 with solutions of 8% acetone and 92% Skellysolve B hexanes; fractions 7 through 12, 12% acetone and 88% Skellysolve B. All fractions were 630 ml. portions. Fractions 9 through 12 were combined and evpaorated to give 1.46 g. of semicrystalline material. This material was recrystallized from methanol to give 1.23 g. of product as white crystals of melting point 170 to 172.5°. An analytical sample of 6α-methyl-9α-fluoro-11β-hydroxy-4-pregnene-3,20-dione (V) was prepared by additional crystallization from methanol melted at 172 to 172.5° and had a rotation of $[\alpha]_D$ plus 171 in acetone.

Analysis.—Calcd. for $C_{22}H_{30}O_3F$: C, 72.90; H, 8.62; F, 5.24. Found: C, 72.72; H, 8.98; F, 5.30.

Following the procedure of Preparation 4 but substituting 6α,16α-dimethyl-9β,11β-oxido-4-pregnene-3,20-dione (IV) as starting material, yields 6α,16α-dimethyl-9α-fluoro-11β-hydroxy-4-pregnene-3,20-dione (V).

PREPARATION 4A

6α-Methyl-9α-Fluoro-11β-Hydroxy-4-Pregnene-3,20-Dione (V)

Alternatively, 6α-methyl-9α-fluoro-11β-hydroxy-4-pregnene-3,20-dione (V) can conveniently be prepared from 5α,11α-dihydroxy-6β-methylpregnane-3,20-dione [Spero et al., J. Am. Chem. Soc. 78, 6213 (1956)] by making the 11α-toluenesulfonate in known manner with toluenesulfonyl chloride, dehydrating the toluenesulfonate by heating in aqueous solution to obtain 5α-hydroxy-6β-methyl-9(11)-pregnene-3,20-dione, dehydrating thereafter with sodium hydroxide solution to obtain 6α-methyl-4,9(11)-pregnadiene-3,20-dione (II). This compound is then submitted to the steps shown in Preparations 2 to 4, inclusive, to give the desired product 6α-methyl-9α-fluoro-11β-hydroxy-4-pregnene-3,20-dione (V).

PREPARATION 5

6α-Methyl-9α-Fluoro-4-Pregnene-3,11,20-Trione (6α-Methyl-9α-Fluoro-11-Ketoprogesterone) (VI)

To a solution of 0.5 grams of 6α-methyl-9α-fluoro-11β-hydroxyprogesterone (V) in 10 ml. of acetic acid is added 150 mg. of chromic anhydride, dissolved in 3 ml. of acetic acid and 0.2 ml. of water. The mixture is allowed to stand at room temperature (24° C.) for a period of about four hours, then poured into 50 ml. of water, neutralized with sodium bicarbonate and extracted with three 25-ml. portions of methylene chloride. The methylene chloride extracts are combined, washed twice with water, dried over anhydrous sodium sulfate, evaporated and the residue twice recrystallized from methanol to give 6α-methyl-9α-fluoro-4-pregnene-3,11,20-trione (6α-methyl-9α-fluoro-11-ketoprogesterone) (VI).

Following the procedure of Preparation 5 but substituting 6α,16α-dimethyl-9α-fluoro-11β-hydroxyprogesterone (V) as starting material, yields 6α,16α-dimethyl-9α-fluoro-11-ketoprogesterone (VI).

PREPARATION 6

6α-Methyl-9α-Fluoro-11β-Hydroxy-1,4-Pregnadiene-3,20-Dione (1-Dehydro-6α-Methyl-9α-Fluoro-11β-Hydroxyprogesterone) (VII)

0.7 g. of 6α-methyl-9α-fluoro-11β-hydroxyprogesterone (V) is dissolved in 50 ml. of tertiary butyl alcohol and thereto is added 5 ml. of acetic acid and 250 mg. of selenium dioxide. The mixture is heated to 75° C. and stirred for a period of about 24 hours. Thereafter another portion of 250 mg. of selenium dioxide is added, heated at 75° C. and stirring continued for about 24 hours. The mixture is cooled, filtered to remove the excess selenium dioxide and evaporated. The thus-obtained residue is recrystallized four times from acetone-Skellysolve B hexane hydrocarbons to give pure 1-dehydro-6α-methyl-9α-fluoro-11β-hydroxyprogesterone (VII).

Following the procedure of Preparation 6 but substituting 6α,16α-dimethyl-9α-fluoro-11β-hydroxyprogesterone (V) as starting material, yields 6α,16α-dimethyl-9α-fluoro-11β-hydroxy-1,4-pregnadiene-3,20-dione (VII).

PREPARATION 7

6α-Methyl-9α-Fluoro-1,4-Pregnadiene-3,11,20-Trione (1-Dehydro-6α-Methyl-9α-Fluoro-11-Ketoprogesterone) (VIII)

In the same manner given in Preparation 5, oxidizing with chromic anhydride in acetic acid 1-dehydro-6α-methyl-9α-fluoro-11β-hydroxyprogesterone (V), yields 1-dehydro-6α,-methyl-9α-fluoro-11-ketoprogesterone (6α-methyl-9α-fluoro-1,4--pregnadiene-3,11,20-trione) (VIII).

Following the procedure of Preparation 7 but substituting 1-dehydro-6α,16α-dimethyl-9α-fluoro-11β-hydroxyprogesterone (VII) as starting material, gives 1-dehydro-6α,16α-dimethyl-11-ketoprogesterone (VIII).

PREPARATION 8

6α-Methyl-9α-Fluoro-11β-Hydroxy-4-Pregnadiene-3,20-Dione (1-Dehydro-6α-Methyl-9α-Fluoro-11β-Hydroxyprogesterone) (VII)

Five 100-ml. portions of a medium in 250-ml. Erlenmeyer flasks containing 1% Cerelose corn sugar, 2% corn steep liquor (60% solids) and tap water is adjusted to a pH of 4.95. This medium is sterilized for one hour at 20 lbs. per square inch pressure and 120° C. and inoculated with a one to two day growth of Septomyxa affinis A.T.C.C. 6737. The Erlenmeyer flasks are shaken at room temperature (about 24° C.) for a period of three days. At the end of this period, this 500-ml. volume is used as an inoculum for 10 l. of the same glucose-corn steep liquor medium which in addition contains 10 ml. of an antifoam (a mixture of lard oil and octadecanol). The fermentor is placed in the water bath, adjusted to 28° C., and the contents are stirred (300 r.p.m.) and aerated (0.5 l. air per 10 l. beer per minute). After about 19 hours of incubation, when a good growth develops, 2 g. of 6α-methyl-9α-fluoro-11β-hydroxyprogesterone (V), dissolved in 50 ml. of acetone, and 1 g. of 11β,21-dihydroxy-4,17(20)-pregnadiene-3-one as promoter is added and the incubation (conversion) carried out at the same temperature and aeration for 19 hours. The mycelium is filtered and the steroidal material extracted with four three-liter portions of methylene chloride. The mycelium is extracted with two 500-ml. portions of acetone and two 500-ml. portions of methylene chloride. The extracts are combined, evaporated and the residue chromatographed over Florisil. The fractions obtained with 5 to 15% acetone-Skellysolve B are combined, evaporated and the residue twice recrystallized from methanol to give white crystals of 1-dehydro-6α-methyl-9α-fluoro-11β-hydroxyprogesterone (VII), the compound also produced by the method of Preparation 6, above.

Following the procedure of Preparation 8 but substituting 6α,16α-dimethyl-9α-fluoro-11β-hydroxyprogesterone (V) as starting material, yields 1-dehydro-6α,16α-dimethyl-9α-fluoro-11β-hydroxyprogesterone (VII).

In the same manner given in Preparation 8 submitting 6α-methyl-9α-fluoro-4-pregnene-3,11,20 trione (VI) to fermentation by Septomyxa affinis A.T.C.C. 6737 results in the production of 1-dehydro-6α-methyl-9α-fluoro-11-ketoprogesterone (VIII). Alternatively, 1-dehydro-6α-methyl-9α-fluoro-11-ketoprogesterone (VIII) is obtained by oxidizing 1-dehydro-6α-methyl-9α-fluoro-11β-hydroxyprogesterone (VII) as shown in Preparation 5.

Likewise, submitting 6α,16α-dimethyl-9α-fluoro-4-pregnene-3,11,20-trione (VI) to fermentation by Septomyxa affinis A.T.C.C. 6737 results in the production of 1-dehydro-6α,16α-dimethyl-9α-fluoro-11-ketoprogesterone (VIII). Alternatively, 1-dehydro-6α,16α-dimethyl-9α-fluoro-11-ketoprogesterone (VIII) is obtained by oxidizing 1-dehydro-6α,16α-dimethyl-9α,11β-hydroxyprogesterone (VII) as shown in Preparation 5.

Instead of using Septomyxa affinis in the 1-dehydrogenation of Preparation 8, 1-dehydro-6α-methyl-9α-fluoro-11β-hydroxyprogesterone (VII) and 1-dehydro-6α-methyl-9α-fluoro-11-ketoprogesterone (VIII) can be prepared by dehydrogenating 6α-methyl-9α-fluoro-11β-hydroxyprogesterone (V) and 6α-methyl-9α-fluoro-11-ketoprogesterone (VI) respectively, with other species of the genus Septomyxa or species selected from the microorganisms of the genera: Calonectria, Alternaria, Colletotrichum, Cylindrocarpon, Ophiobolus, Listera, Corynebacterium, Erysipelothrix species of the family Tuberculariaceae, Nocardia, Cucurbitaria, Leptosphaeriae, Tricothecium, Mycobacterium, Fusarium, Didymella and the like.

Likewise, instead of employing Septomyxa affinis utlizied in the 1-dehydrogenation of Preparation 8, 1-dehydro-6α,16α-dimethyl-9α-fluoro-11β-hydroxyprogesterone (VII) and 1-dehydro-6α,16α-dimethyl-9α-fluoro- 11-ketoprogesterone (VIII) can be prepared by the fermentation of 6α,16α-dimethyl-9α-fluoro-11β-hydroxyprogesterone (V) and 6α,16α-dimethyl-9α-fluoro-11-ketoprogesterone (VI) with other species of the genus Septomyxa or species selected from the microorganisms of the genera disclosed in the immediately preceding paragraph.

EXAMPLE 1

6 - Methyl - 9α - Fluoro - 11β - Hydroxy - 4,6 - Pregnadiene - 3,20-Dione (6-Dehydro-6-Methyl-9α-Fluoro-11β-Hydroxyprogesterone) (IX)

A solution of 9.25 g. of 6α-methyl-9α-fluoro-11β-hydroxy-4-pregnene-3,20-dione (V) and 13.87 g. of chloranil (2,3,5,6-tetrachloro-1,4-benzoquinone) in 550 ml. of t-amyl alcohol was stirred and heated at reflux for a period of about 3 hours. The solvent was removed under reduced pressure at steam bath temperature and the dark muddy residue dissolved in 1 l. of methylene chloride. The methylene chloride solution was washed first with 800 ml. of 2.5% sodium hydroxide solution (in 3 portions) then with water, dried with anhydrous sodium sulfate and poured over a 500 g. column of Florisil. The column was eluted with 6 l. of a mixture of acetone and Skellysolve B (1:9) and with 4 l. of a mixture of acetone and Skellysolve B (2:8). Evaporation of the eluates to dryness gave 5.526 g. of crude crystalline product which was dissolved in 250 ml. of methanol, decolorized with Darco G–60 (activated carbon) and the solution concentrated to about 75 ml. to give 4.163 g. of product with a melting point of 240 to 244° C. An analytical sample of the product, 6-methyl-9α-fluoro-11β-hydroxy-4,6-pregnadiene-3,20-dione (IX), was recrystallized from methanol and melted at 245 to 247° C.; $[\alpha]_D$ +167° C. (dioxane);

$$\lambda_{max.}^{alc.} 286, \epsilon = 22,150$$

Analysis.—Calcd. for $C_{22}H_{29}O_3F$: C, 73.30; H, 8.11; F, 5.27. Found: C, 73.10; H, 8.23; F, 5.17.

Following the procedure of Example 1 but substituting as starting material, 6α,16α-dimethyl-9α-fluoro-11β-hydroxy-4-pregnene-3,20-dione (V) for the corresponding 16α-desmethyl compound (V), yields 6,16α-dimethyl-9α-fluoro-11β-hydroxy-4,6-pregnadiene-3,20-dione (IX).

EXAMPLE 2

6 - Methyl - 9α - Fluoro - 4,6 - Pregnadiene - 3,11,20-Trione (6-Dehydro-6-Methyl-9α-Fluoro-11-Ketoprogesterone) (X)

To a solution of 0.5 g. of 6-methyl-9α-fluoro-11β-hydroxy-4,6-pregnadiene-3,20-dione (IX) in 100 ml. of acetone at about 3° C. was added 1 ml. of oxidizing reagent (composed of 26.73 g. chromium trioxide, 23 ml. of concentrated sulfuric acid and water to make a total volume of 100 ml.). After stirring for a period of about one hour at about 3° C., 2 ml. of methanol was added followed by 200 ml. of water. The mixture was concentrated under reduced pressure at about 60° C. bath temperature until about 150 ml. remained. This material gave 435 mg. of precipitate that was isolated by filtration, treated with Darco G–60 in acetone, filtered, and the solvent removed. The residue was chromatographed over a 50 g. column of Florisil and eluted with a mixture of acetone and Skellysolve B (1:9) to give 397 mg. of product. Crystallization of this material from a mixture of acetone and Skellysolve B gave 321 mg. of product with a melting point of 140 to 144° C. An analytical sample, prepared by recrystallizing a portion of the product twice from the same pair of solvents, yielded the desired compound, 6-methyl-9α-fluoro-4,6-pregnadiene-3,11,20-trione (X); it melted at 143 to 145° C.; $[\alpha]_D$ +219° (acetone);

$$\lambda_{max.}^{alc.} 284, \epsilon = 22,650$$

Analysis.—Calcd. for $C_{22}H_{27}O_3F$: C, 73.71; H, 7:59; F, 5.30. Found: C, 73.50; H, 7.48; F, 4.89.

Following the procedure of Example 2 but substituting 6,16α - dimethyl - 9α - fluoro - 11β - hydroxy - 4,6 - pregnadiene-3,20-dione (IX) as starting material, yields 6,16α-dimethyl - 9α - fluoro - 4,6 - pregnadiene - 3,11,20 - trione (X).

EXAMPLE 3

6 - Methyl - 9α - Fluoro - 4,6 - Pregnadiene - 3,11,20-Trione (6 - Dehydro - 6-Methyl-9α-Fluoro-11-Ketoprogesterone) (X)

Following the procedure of Example 1 but substituting 6α - methyl - 9α - fluoro - 4 - pregnene - 3,11,20 - trione (VI) as starting material, yields 6-methyl-9α-fluoro-4,6-pregnadiene-3,11,20-trione (X).

Following the procedure of Example 1 but substituting 6α,16α - dimethyl - 9α - fluoro - 4 - pregnene - 3,11,20-trione (VI) as starting material, yields 6,16α-dimethyl-9α-fluoro-4,6-pregnadiene-3,11,20-trione (X).

EXAMPLE 4

6 - Methyl - 9α - Fluoro - 11β - Hydroxy - 1,4,6-Pregnatriene-3,20-Dione (1,6-Bisdehydro-6-Methyl-9α-Fluoro-11β-Hydroxyprogesterone) (XI)

A solution of 12 g. of 6α-methyl-9α-fluoro-11β-hydroxy-1,4-pregnadiene-3,20-dione (VII) (from Preparation 6) and 10 g. of chloranil in 500 ml. of tertiary amyl alcohol is refluxed for a period of about 4.5 hours. The tertiary amyl alcohol is then distilled off under vacuum in a nitrogen atomsphere. The residue is dissolved in methylene chloride and then shaken with dilute sodium hydroxide. The precipitate that forms is separated by filtration through diatomaceous earth. The organic phase of the filtrate is separated, washed first with dilute sodium hydroxide solution, then water and dried. The solvent is distilled off leaving a residue of crystalline 6-methyl-9α - fluoro - 11β - hydroxy - 1,4,6 - pregnatriene - 3,20-dione (XI).

Following the procedure of Example 4 but substituting 6α,16α - dimethyl - 9α - fluoro - 11β - hydroxy - 1,4 - pregnadiene-3,20-dione (VII) as starting material, yields 6,16α - dimethyl - 9α - fluoro - 11β - hydroxy-1,4,6-pregnatriene-3,20-dione (XI).

EXAMPLE 5

6 - Methyl - 9α - Fluoro - 1,4,6 - Pregnatriene - 3,11,20-Trione (1,6 - Bisdehydro-6-Methyl-9α-Fluoro-11-Ketoprogresterone) (XII)

To a solution of 0.2 g. of 6-methyl-9α-fluoro-11β-hydroxy-1,4,6-pregnatriene-3,20-dione (XI) in 4 ml. of acetic acid is added 60 mg. of chromic anhydride, dissolved in 1 ml. of acetic acid and 0.1 ml. of water. The mixture is allowed to stand at room temperature for a period of about 4 hours, then poured into 50 ml. of water, neutralized with sodium bicarbonate and extracted with three 10 ml. portions of methylene chloride. The methylene chloride extracts are combined, washed with water, dried over anhydrous sodium sulfate, evaporated, and the thus produced residue twice recrystallized from methanol to give 6-methyl-9α-fluoro-1,4,6-pregnatriene-3,11,20-trione (XII).

Following the procedure of Example 5 but substituting 6,16α-dimethyl-9α-fluoro-11β-hydroxy-1,4,6-pregnatriene-3,20-dione (XI) as starting material, yields 6,16α-dimethyl-9α-fluoro-1,4,6-pregnatriene-3,11,20-trione (XII).

EXAMPLE 6

6 - Methyl - 9α - Fluoro - 1,4,6 - Pregnatriene - 3,11,20-Trione (1,6 - Bisdehydro - 6 - Methyl - 9α - Fluoro-11-Ketoprogesterone) (XII)

Following the procedure of Example 4 but substituting 6α - methyl - 9α - fluoro - 1,4 - pregnadiene - 3,11,20- trione (VIII) as starting material, yields 6-methyl-9α-fluoro-1,4,6-pregnatriene-3,11,20-trione (XII).

Following the procedure of Example 4 but substituting 6α,16α - dimethyl - 9α - fluoro - 1,4 - pregnadiene - 3,11,20-trione (VIII) as starting material, yields 6,16-dimethyl-9α-fluoro-1,4,6-pregnatriene-3,11,20-trione (XII).

EXAMPLE 7

6 - Methyl - 9α - Fluoro - 11β - Hydroxy - 1,4,6 - Pregnatriene - 3,20 - Dione (1,6 - Bisdehydro - 6 - Methyl-9α-Fluoro-11β-Hydroxyprogesterone) (XI)

A mixture containing 10 g. of 6-methyl-9α-fluoro-11β-hydroxy-4,6-pregnadiene-3,20-dione (IX) (from Example 1), 500 ml. of tertiary butyl alcohol, 5 ml. of glacial acetic acid and 4 g. of selenium dioxide is warmed at reflux for 24 hours. An additional 4 g. portion of selenium dioxide is added and warming is continued for another 24-hour period.

The reaction mixture is cooled and filtered. The filtrate is concentrated to about 150 ml., then slowly diluted with 850 ml. of water. The resulting precipitate is isolated by filtration. The precipitate is dissolved in 300 ml. of ethyl acetate, then washed with four 100-ml. portions of freshly prepared cold ammonium sulfide, dilute ammonium hydroxide, water, dilute hydrochloric acid and water. The solution is dried over sodium sulfate and evaporated to give a residue containing 6-methyl-9α-fluoro - 11β - hydroxy - 1,4,6 - pregnatriene - 3,20 - dione (XI).

Following the procedure of Example 7 but substituting 6,16α - dimethyl - 9α - fluoro - 11β - hydroxy - 4,6 - pregnadiene-3,20-dione (IX) as starting material, yields 6,16α - dimethyl - 9α - fluoro - 11β - hydroxy - 1,4,6 - pregnatriene-3,20-dione (XI).

EXAMPLE 8

6 - Methyl - 9α - Fluoro - 1,4,6 - Pregnatriene - 3,11,20-Trione (1,6 - Bisdehydro - 6 - Methyl - 9α - Fluoro-11-Ketoprogesterone) (XII)

Following the procedure of Example 7 but substituting 6 - methyl - 9α - fluoro - 4,6 - pregnadiene - 3,11,20-trione (X) as starting material, yields 6-methyl-9α-fluoro-1,4,6-pregnatriene-3,11,20-trione (XII).

Following the procedure of Example 7 but substituting 6,16α - dimethyl - 9α - fluoro - 4,6 - pregnadiene - 3,11,20-trione (X) as starting material, yields 6,16α-dimethyl-9α-fluoro-1,4,6-pregnatriene-3,11,20-trione (XII).

EXAMPLE 9

6 - Methyl - 9α - Fluoro - 11β - Hydroxy - 1,4,6 - Pregnatriene - 3,20 - Dione (1,6 - Bisdehydro - 6 - Methyl-9α-Fluoro-11β-Hydroxyprogesterone) (XI)

A mixture of 400 mg. of 6α-methyl-9α-fluoro-11β-hydroxy-4-pregnene-3,20-dione (V), 1.5 g. of chloranil and 15 ml. of secondary amyl alcohol is heated at reflux temperature for a period of about 3 hours. The reaction mixture is filtered and the filtrate evaporated to dryness. The residue is dissolved in chloroform and the solution washed successively several times with each of the following: water, 5% sodium hydroxide solution, and again water. The solution is dried with sodium sulfate and then concentrated to dryness. The residue is dissolved in 50 ml. of methylene chloride and chromatographed by pouring onto a 50 g. column of Florisil; elution with a mixture of acetone and Skellysolve B yields pure crystalline 6 - methyl - 9α - fluoro - 11β - hydroxy - 1,4,6 - pregnatriene-3,20-dione (XI).

Following the procedure of Example 9 but substituting 6α,16α - dimethyl - 9α - fluoro - 11β - hydroxy - 4 - pregnene-3,20-dione (V) as starting material, yields 6,16α-dimethyl - 9α - fluoro - 11β - hydroxy - 1,4,6 - pregnatriene-3,20-dione (XI).

EXAMPLE 10

6 - Methyl - 9α - Fluoro - 1,4,6 - Pregnatriene - 3,11,20-Trione (1,6 - Bisdehydro - 6 - Methyl - 9α - Fluoro-11-Ketoprogesterone) (XII)

Following the procedure of Example 9 but substituting 6α - methyl - 9α - fluoro - 4 - pregnene - 3,11,20 - trione (VI) as starting material, yields 6-methyl-9α-fluoro-1,4,6-pregnatriene-3,11,20-trione (XII).

Following the procedure of Example 9 but substituting 6α,16α - dimethyl - 9α - fluoro - 4 - pregnene - 3,11,20-trione (VI) as starting material, yields 6-methyl-9α-fluoro-1,4,6-pregnatriene-3,11,20-trione (XII).

I claim:

1. A 6-methyl-9α-fluoro-11-oxygenated compound of the formula

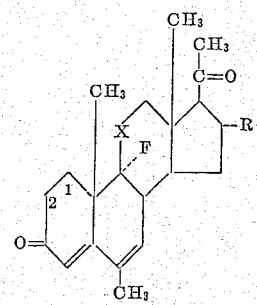

wherein X is selected from the group consisting of the β-hydroxymethylene radical

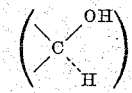

and the carbonyl radical (>C=O), R is selected from the group consisting of hydrogen and methyl and the linkage between carbon atoms 1 and 2 is selected from those consisting of single and double bonds.

2. 6 - methyl - 9α - fluoro - 11β - hydroxy - 4,6 - pregnadiene-3,20-dione.

3. 6 - methyl - 9α - fluoro - 4,6 - pregnadiene - 3,11,20-trione.

4. 6,16α - dimethyl - 9α - fluoro - 11β - hydroxy - 4,6-pregnadiene-3,20-dione.

5. 6,16α - dimethyl - 9α - fluoro - 4,6 - pregnadiene-3,11,20-trione.

6. 6 - methyl - 9α - fluoro - 11β - hydroxy - 1,4,6-pregnatriene-3,20-dione.

7. 6 - methyl - 9α - fluoro - 1,4,6 - pregnatriene - 3,11,20-trione.

8. 6,16α - dimethyl - 9α - fluoro - 11β - hydroxy - 1,4,6-pregnatriene-3,20-dione.

9. 6,16α - dimethyl - 9α - fluoro - 1,4,6 - pregnatriene-3,11,20-trione.

References Cited in the file of this patent

UNITED STATES PATENTS

| | | |
|---|---|---|
| 2,883,379 | Moreland et al. | Apr. 21, 1959 |
| 2,891,079 | Dodson et al. | June 16, 1959 |
| 2,968,662 | Ringold et al. | Jan. 17, 1961 |